United States Patent [19]

Pierce et al.

[11] Patent Number: 4,693,486
[45] Date of Patent: Sep. 15, 1987

[54] TRAILING ARM SUSPENSION WITH WRAPPER COMPRESSION AXLE MOUNTING

[75] Inventors: William C. Pierce, Muskegon; John P. Smith, Grand Rapids, both of Mich.

[73] Assignee: Lear Siegler, Inc., Santa Monica, Calif.

[21] Appl. No.: 849,762

[22] Filed: Apr. 9, 1986

[51] Int. Cl.$^4$ ............................................. B60B 35/00
[52] U.S. Cl. .................................. 280/80 R; 180/88; 180/905; 280/688; 280/713; 24/457
[58] Field of Search ............... 280/688, 711, 712, 713, 280/80 R, 80 A; 180/88, 905; 24/455, 457

[56] References Cited

U.S. PATENT DOCUMENTS

| | | | |
|---|---|---|---|
| 923,135 | 6/1909 | Brown | 301/135 |
| 1,196,436 | 8/1916 | Dorn | 301/127 |
| 1,306,685 | 6/1919 | Cartwright | 280/719 |
| 2,108,792 | 2/1938 | Beardsley | 280/80 R |
| 2,773,698 | 12/1956 | Slemmons et al. | 280/678 |
| 2,913,252 | 11/1959 | Norrie | 280/713 |
| 3,043,606 | 7/1962 | Raidel | 280/677 |
| 3,285,621 | 11/1966 | Turner, Jr. | 280/704 |
| 3,502,348 | 3/1970 | Bellamy et al. | 280/80 R |
| 3,547,215 | 12/1970 | Bird | 180/71 |
| 3,617,072 | 11/1971 | Turner, Jr. | 280/704 |
| 3,707,298 | 12/1972 | Henry et al. | 280/717 |
| 3,730,549 | 5/1973 | Turner, Jr. | 280/704 |
| 3,799,571 | 3/1974 | Sudberry | 280/715 |
| 3,861,708 | 1/1975 | Fier | 280/712 |
| 3,877,718 | 4/1975 | Scanlon et al. | 280/704 |
| 3,902,734 | 9/1975 | Fier | 280/799 |
| 3,904,220 | 9/1975 | Fier | 280/704 |
| 4,000,913 | 1/1977 | Gibson | 280/704 |
| 4,016,947 | 4/1977 | Chamberlain | 403/389 |
| 4,166,640 | 9/1979 | Van Denberg | 280/711 |
| 4,174,855 | 11/1979 | Van Denberg | 280/711 |
| 4,545,452 | 10/1985 | Morink et al. | 180/88 |

FOREIGN PATENT DOCUMENTS

1680052  7/1977  Fed. Rep. of Germany .

OTHER PUBLICATIONS

Neway AR-90 Series Installation brochures, copyright 1984.
Neway Product Improvement Bulletin No. 177, dated Jun. 30, 1983.
Neway publication SRK-7, 5" Sq Axle Connection, copyright 1982, p. SD-482.
Neway publication Ar I Series, Trailer Air Suspension Installation, copyright 1982, p. SD-233.
Neway Installation Drawing No. E17000057, dated 1/14/81, entitled Two Spring Frame and Axle Attachment Instructions.
Hutchens Industries Incorporated publication H-7600 Suspension Series.
Hutchens Industries Incorporated publication entitled "Recommended Installation Instructions for Trailer Suspensions", HSB-21, 5,76.
Fruehauf publication entitled "Walking Beam Affords Strong Ride, Longer".
Fruehauf publication entitled "Put All Your Eggs in One Suspension"—Pro-Par's New Cargo Care Air Ride.

(List continued on next page.)

Primary Examiner—David M. Mitchell
Assistant Examiner—Kenneth R. Rice
Attorney, Agent, or Firm—Varnum, Riddering, Schmidt & Howlett

[57] ABSTRACT

A vehicle suspension system for mounting ground-engaging wheels to a vehicle frame where two arms are secured to opposite sides of the frame and a wheel-carrying axle is suspended between the arms. The axle is secured to the arms by a wrapper plate partially surrounding the axle, and a bolt is utilized to compress the wrapper plate about the axle so that the wrapper plate supports and strengthens the axle. A plug weld is provided between the axle and the wrapper plate. The wrapper generally conforms to the profile of that portion of the axle which it surrounds. The axle can be square, round or D-shaped in cross-section.

18 Claims, 6 Drawing Figures

OTHER PUBLICATIONS

Fruehauf publication entitled "Maximum Dumping Stability, from Hopper and End Dumps".

Neway installation drawing entitled Rubber Mounted Tilt Spring Suspension, Print No. RTS-500, dated Jul. 2, 1958.

Neway installation instruction entitled Neway Wide Spread Tandem Suspension, Drawing No. NN-960-B, dated May 31, 1956.

Neway installation instruction entitled TS Neway Tandem Models for Trailers, Drawing No. 4NP-100-B, dated Oct. 26, 1950.

Neway installation instruction entitled Truck-Tractor Pusher 2 to 1 Load Distribution, Drawing No. P-200, dated May 9, 1958.

Neway T. S. & L. D. Tandem Model Installation Drawing, Drawing No. 140 00 055, dated Jan. 10, 1980.

Neway specification and installation drawing No. NP-4200.

Neway installation instructions for Neway models SL-618, etc., p. SD-97-3-65.

Reyco Industries publication, entitled "Suspension Master Parts Catalog", SC-1171, Revised 10-75.

Neway installation instruction, entitled Attachment of Neway Tandem to I-Beam Axle, Print No. SK-7953, dated Jul. 9, 1953.

Rockwell-Standard Corp. Field Maintenance Manual No. 14, 4M—Rev. 3-66, pp. 2-6.

TRAILING ARM SUSPENSION WITH WRAPPER COMPRESSION AXLE MOUNTING

FIELD OF THE INVENTION

The invention relates to vehicle suspension systems for mounting ground-engaging wheels to a vehicle frame and, more particularly, to the axle support means for securing a wheel-carrying axle to a vehicle.

BACKGROUND OF THE INVENTION

Vehicle suspension structures are well-known in the art. In particular, vehicle suspension structures having arms suspended from a vehicle frame and a wheel-bearing axle suspended from the trailing arm are known. An example of this type of vehicle suspension structure is disclosed in the Bird U.S. Pat. No. 3,547,215 issued Dec. 15, 1970. As in the patent to Bird, a square axle is typically welded to a bracket which is, in turn, secured to the trailing arm of the vehicle suspension structure. The weldment securing the axle to the bracket is usually made at the midpoint of the side where vertical bending moment stresses are neutral. However, these areas are areas of high torsional loading which results from brake torque, vehicle roll and diagonal axle (wheel) walk. The welding at the midpoint of the axle typically introduces a point of weakness where axle failure may initiate. The weakness in the typical axle welded to a bracket is caused, in part, by the undesirable heat-treating effects of the welding process upon the axle material in the localized area adjacent the weldment. In addition, craters or strike marks may form points at which cracks may initiate or at which stresses may become concentrated.

The typical axle is welded to the bracket by a line weld on either side of the bracket. Because it is a line weld, the weldment has "ends" at which stresses are concentrated and at which cracks may initiate.

The typical axle is difficult to install because the axle must be held in place against the axle bracket while extensive welding takes place. This structure both increases assembly time and increases the heat of welding with its resultant undesirable localized heat treatment of the base metal.

Other suspension assemblies include those disclosed in: the Henry et al. U.S. Pat. No. 3,707,298, issued Dec. 26, 1972 which discloses an axle permitted to rock within a receptical. Rocking is yieldably resisted by an elastomer material; the Sudberry U.S. Pat. No. 3,799,571, issued Mar. 26, 1974 which discloses an axle clamped to a leaf spring by a U-bolt assembly; the Raidel U.S. Pat. No. 3,043,606, issued July 10, 1962 which discloses an axle secured immovably to a seat member by a line of weldments; the Brown U.S. Pat. No. 923,135, issued June 1, 1909 which discloses an axle secured within a U-shaped member; the Cartwright U.S. Pat. No. 1,306,685, issued June 17, 1919 which discloses an axle suspended beneath a leaf spring by means of a U-bolt assembly; the Dorn U.S. Pat. No. 1,196,436, issued Aug. 29, 1916 which discloses an axle secured by U-shaped clips to a hood; and Chamberlain U.S. Pat. No. 4,016,947, issued Apr. 12, 1977 which discloses a clamp assembly for securing an axle housing relative to a vehicle frame; the West German Patent Auslegeschrift No. 16 80 052, issued July, 1977, discloses an axle secured within U-clamps to a trailing arm assembly; the Slemmons et al. U.S. Pat. No. 2,773,698, issued Dec. 11, 1956 which discloses an axle suspended beneath a trailing arm by means of arcuate lines of welding securing the axle to semi-cylindrical shells.

The typical axle/axle bracket connection, however, weakens the structural integrity of the axle. This weakness is caused by the extent and location of welding necessary to secure the axle in place.

SUMMARY OF THE INVENTION

The invention relates to a vehicle suspension system for mounting ground-engaging wheels to a vehicle frame. The suspension system includes rearwardly extending arms which extend on either side of the vehicle frame and are pivotably mounted at the forward ends thereof. An axle is suspended between the rearwardly extending arms by means of an axle bracket assembly. The axle support assembly or axle bracket assembly includes a wrapper plate which wraps at least 180° around the axle and also includes a means for compressing the axle in the wrapper plate. The compression of the wrapper plate thereby serves to support and strengthen the axle's structural integrity. To this end, the wrapper plate has an elongated planar surface of complementary shape to the axle and depending sides through which the wrapper plate is compressed against the axle.

A small, non-linear weldment, spot weld or plug weld, is used to secure the axle to the wrapper plate during installation and, in addition, to prevent lateral movement of the axle in the wrapper plate. The wrapper plate preferably comprises a saddle-shaped plate having an aperture in the bight portion thereof to increase flexibility and reduce weight of the wrapper plate and to provide beam clearance. Further, a small aperture is formed in the sides of the wrapper adjacent the vertical midpoint of the axle and the plug weld is positioned in the small aperture.

The axle mounting is particularly suitable for axles which are square in cross-section. In this case, the wrapper can be U-shaped to conform to the axle shape. Alternatively, the axle can be round, or even D shaped, in cross-section and the wrapper can have an arcuate portion to conform with the curvature of the axle.

The wrapper plate is preferably secured to the arms through a pair of side plates which have an opening complementary to the wrapper plate profile and the wrapper plate is positioned within the opening.

Placing the wrapper plate, and also the axle, in compression acts to minimize stress risers which might otherwise occur by counteracting the lateral bending moments to which the axle is subjected. Further, the wrapper plate strengthens the axle at the area of connection to the axle to resist forces due to brake torque, vehicle roll and diagonal axle (wheel) walk. The wrapper plate also surrounds the plug weld, thereby placing the axle in compression around the entire weldment, and strengthening this point which might otherwise be weakened by the weldment. The relatively small area which needs to be welded reduces the amount of heat to which the axle is subjected and, therefore, reduces the amount of undesirable localized heat treatment. The use of a round plug weld eliminates "ends" which would otherwise be present on a line weld and cause positions of stress risers or positions at which cracks could initiate. The manner in which the axle may be placed inside the wrapper plate, and secured by placing the wrapper plate in compression, and the simple manner of plug welding the axle to the wrapper plate increases the ease and efficiency of axle installation. In addition, the plug weld is located at or near the neutral axis of the axle with respect to vertical bending moments, thereby reducing the overall stresses to which the weld is subjected. The shape of the wrapper "gloves" or surrounds the entire axle, taking advantage of its nonround shape in transmitting torque.

BRIEF DESCRIPTION OF THE DRAWINGS

The invention will now be described with reference to the drawings in which.

BRIEF DESCRIPTION OF THE PREFERRED EMBODIMENT

Figure 1:
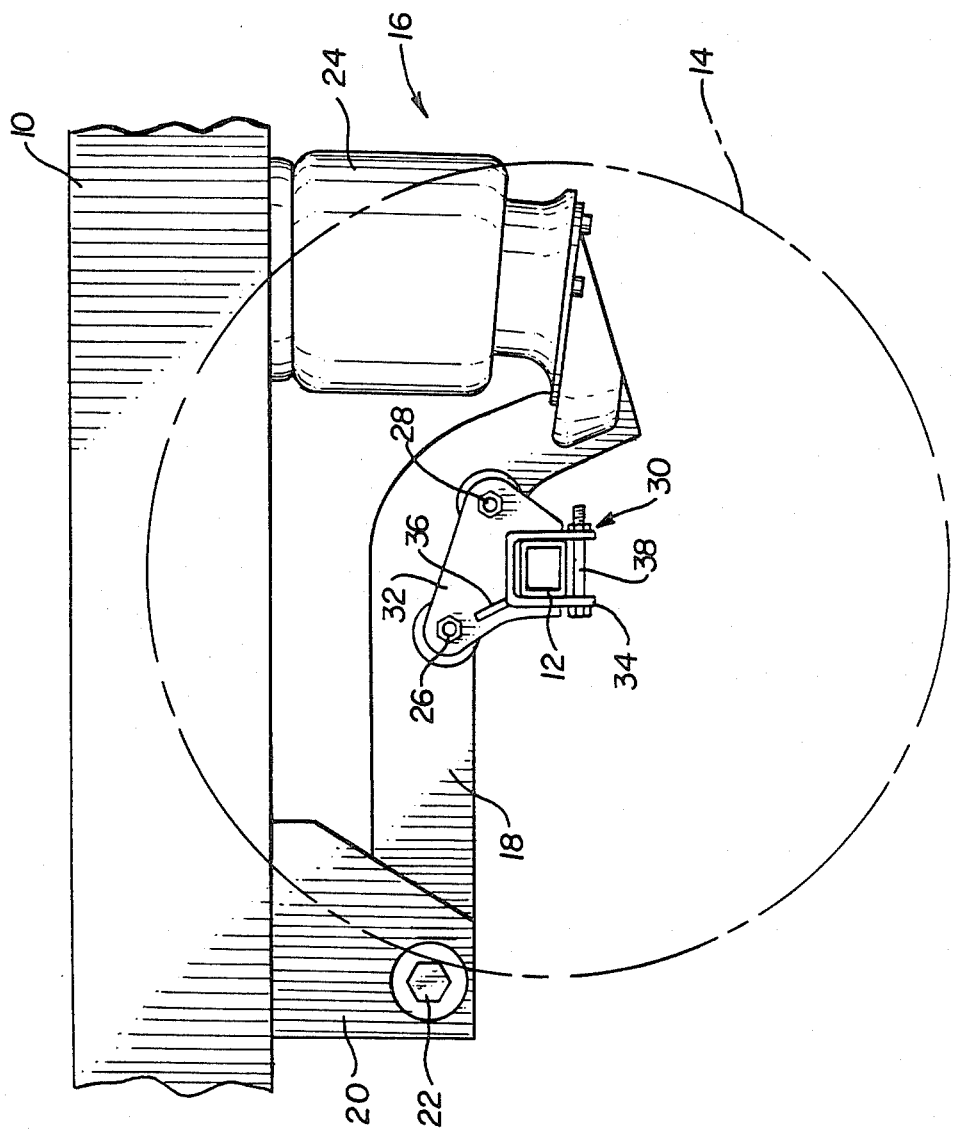
FIG. 1 is fragmentary, side elevational view of a vehicle frame having mounted thereon a suspension system according the invention.

Referring to the drawings and to FIG. 1 in particular, a vehicle frame 10 has an axle 12 and ground-engaging wheels 14 (shown in phantom lines) suspended therefrom by a suspension system 16 according to the invention. The front of the vehicle is to the left of the frame as viewed in FIG. 1. Suspension system 16 includes, at each side of the vehicle frame 10, a trailing arm 18 pivotably mounted to a hanger bracket 20 depending from frame 10. The hanger bracket 20 has a pivot pin 22 at the lower end thereof for pivotably supporting the forward end of trailing arm 18. Trailing arm 18 comprises a hollow rectangular member for supporting an axle 12. The forward end of trailing arm 18 is pivotably mounted at pivot pin 22. The trailing arm 18 extends rearward along the vehicle frame 10. The rear end of trailing arm 18 is secured to an air spring 24. Trailing arm 11 has a slight downward bend intermediate between its forward and rear ends. A forward bushed pin 26 and a rear bushed pin 28 extend through trailing arm 18 near the slight downward bend therein for supporting an axle support assembly 30 while permitting limited articulation between the axle support assembly 30 and the trailing arm 18. The upper portion of the air spring 24 is secured to the vehicle frame 10. In operation, vertical movement of the ground-engaging wheels 14 is translated through axle 12 to the axle support assembly 30. Vertical movement of axle support assembly 30 is translated to trailing arm 18 through forward bushed pin 26 and rear bushed pin 28. A rubber bushing 29 encases bushed pins 26, 28. The limited articulation permitted between axle support assembly 30 and trailing arm 18 by the rubber bushing 29 of forward bushed pin 26 and rear bushed pin 28 cushions the vertical movement of the trailing arm 18 and controls the roll rate of the suspension by permitting axle support assembly 30 to make small vertical displacements without displacing trailing arm 18.

Significant vertical displacement of axle support assembly 30 causes the vertical displacement of trailing arm 18. Vertical movement of trailing arm 18 is permitted by the pivotal connection of the forward end of trailing arm 18 at pivot pin 22. The vertical movement of trailing arm 18 is cushioned and restrained by air spring 24.

The axle support assembly 30, comprises a pair of side plates 32 disposed on either side of trailing arm 18, a U-shaped wrapper plate 34 depending from the side plates 32, a reinforcing plate 36, and a bolt 38 passing through the ends of the U-shape wrapper plate 34 for compressing the sides of the wrapper plate 34. Each side plate 32 comprises a vertical plate having openings at the upper portion thereof to receive forward bushed pin 26 and bushed pin 28. Forward bushed pin 26 and rear bushed pin 28 extend through trailing arm 18 and through corresponding openings in the pair of side plates 32 disposed on either side of trailing arm 18 to secure side plates 32 to trailing arm 18, thereby supporting axle support assembly 30 while permitting limited articulation between the side plates 32 and trailing arm 18. In addition, each side plate 32 has a U-shaped opening adapted at the lower portion thereof to receive in complementary fashion the bight portion of U-shaped wrapper plate 34. The side plate 32 thereby acts to both provide a surface to which wrapper plate 34 may be secured as by welding and also acts to reinforce wrapper plate 34.

Figure 2:
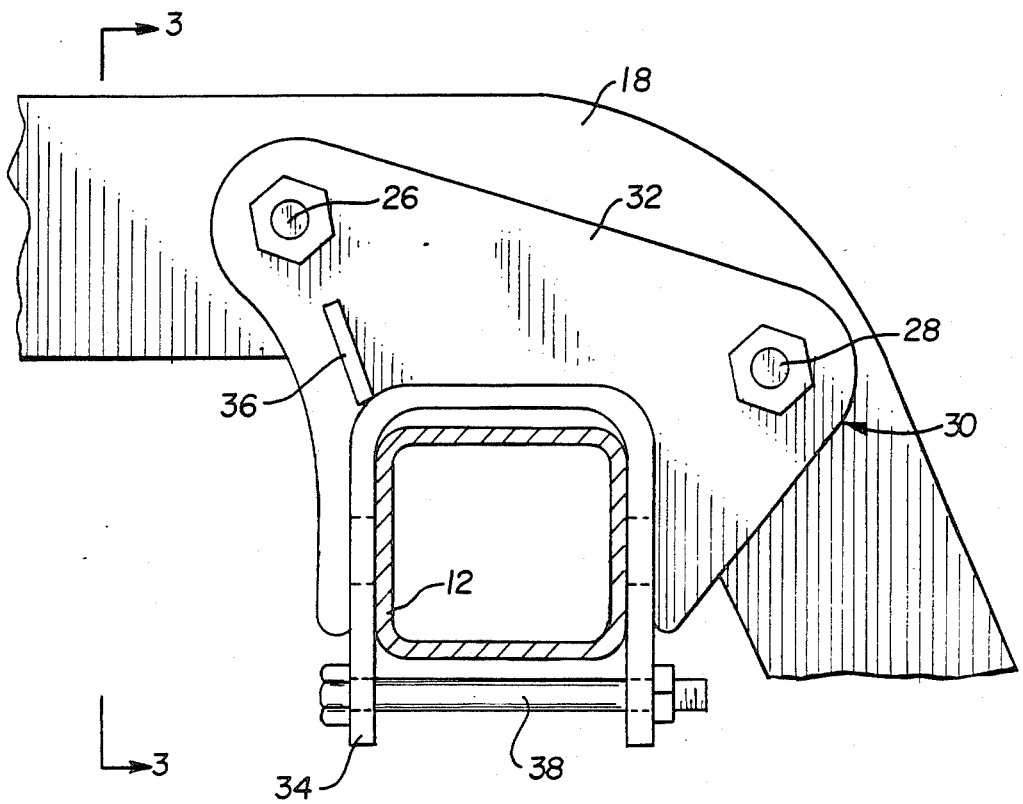
FIG. 2 is an enlarged, fragmentary side sectional view of the suspension shown in FIG. 1.
Figure 3:
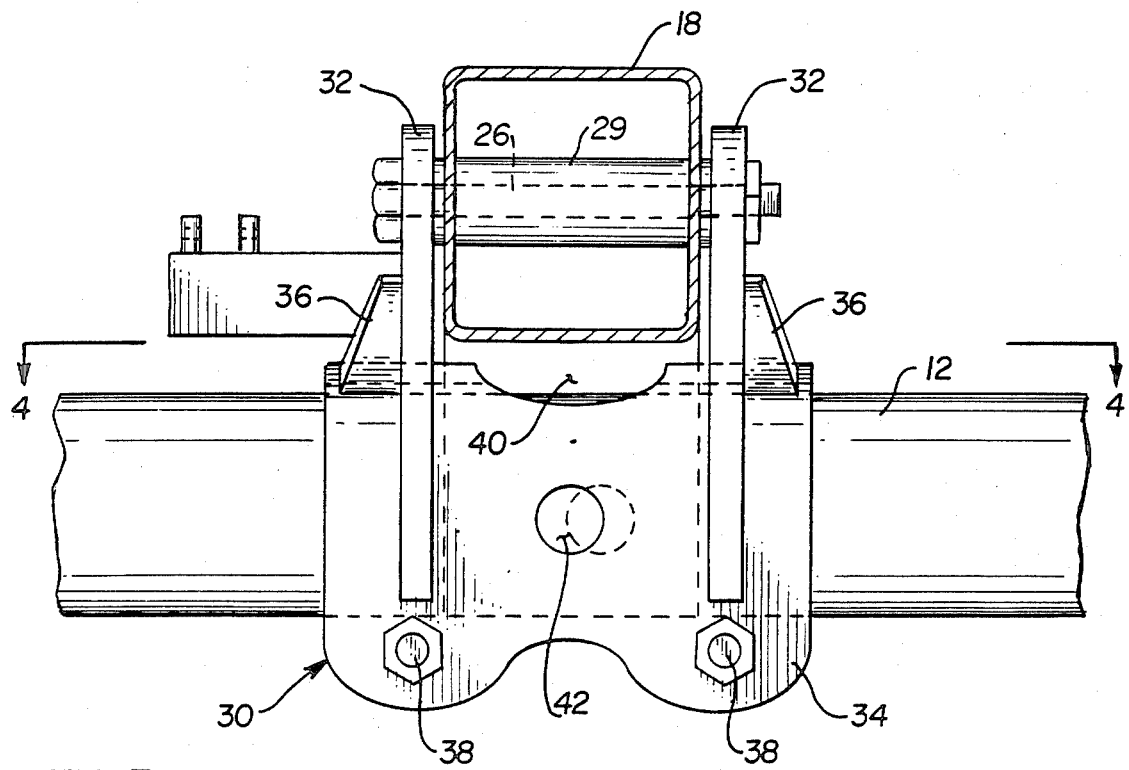
FIG. 3 is a sectional view taken along line 3—3 in FIG. 2.
Figure 4:
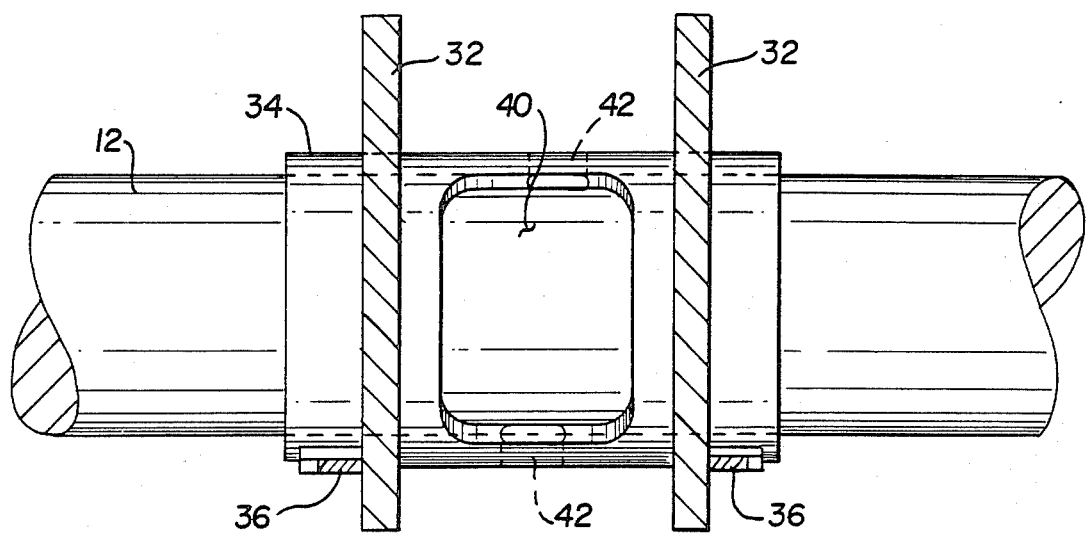
FIG. 4 is a sectional view taken along line 4—4 in FIG. 2.

Wrapper plate 34, as may be seen in FIG. 3, is a saddle-shaped plate. As may be seen in FIG. 2, the wrapper plate 34 is of U-shaped cross-section. The bight portion of wrapper plate 34 is disposed upwardly within side plates 32 and the open end of wrapper plate 4 extends downwardly. Wrapper plate 34 is secured to side plates 32 as by welding. Wrapper plate 34 is adapted to snugly receive an axle 12 having a square or rectangular cross sectional configuration with a small space between the upper surface of the axle and the inside surface of the wrapper place 34. As can be seen in FIG. 3, wrapper plate 34 has an aperture 40 in the bight portion of the U-shaped wrapper plate 34 to reduce the overall weight of the axle support assembly 30 and to increase the flexibility of wrapper plate 34 and to provide beam clearance. Wrapper plate 34 has a small circular aperture on one or both sides thereof adapted to receive a plug weld 42. The plug weld 42 is located so as to correspond to the vertical mid-point of the adjacent side of axle 12. Plug weld 42 prevents lateral or side-to-side movement of axle 12 with respect to wrapper plate 34. In addition, plug weld 42 prevents any slight vertical movement of axle 12 with respect to wrapper plate 34. The small size of plug weld 42 reduces installation time compared to the conventional long weldments used to secure axles to vehicle frames, and also reduces the amount of heat necessary to complete the welding process, thereby reducing the amount of undesirable localized heat treatment of the axle and wrapper plate material. In addition, the relatively small size of the plug weld 42 with respect to the typical long weldment used to secure an axle to a vehicle frame minimizes the stress risers caused by the presence of the weldment. The round shape of the plug weld 42 is an improvement over the long weldment typically used to secure an axle to a vehicle frame because the plug weld 42 has no distinct end. Thus, there is no end at which stress or fatigue failure is likely to initiate. The shape of plug weld 42 is also advantageous because there is no need for the welder to backup the arc upon reaching the end of a weldment line to avoid cratering. The location of plug weld 42 is advantageous because the plug weld is located at the midpoint of the adjacent vertical face of axle 12. The plug weld 42 is, thereby, located at the neutral axis with respect to vertical bending moments. Thus, little, if any, stress will be placed on plug weld 42 due to the vertical bending moments to which the axle may be subjected. The plug weld 42 is located at a position of high torsional stress as well as a position of high lateral bending moment stress. As previously mentioned, however, the small size and rounded shape of plug weld 42 reduces the problem of stress risers due to the weldment. In addition, wrapper plate 34 entirely surrounds plug weld 42, thereby strengthening the axle at the point of the plug weld 42. In other words, axle 12 is not weakened by the connection at a location of high torsional stress and high lateral bending stress, but rather is strengthened by the plug weld and wrapper plate connection.

Wrapper plate 34 include bolts 38 extending through the sides of the U-shaped wrapper plate 34. As completely assembled, the bolts 38 are positioned beneath the axle 12 and are adapted to place the sides of U-shaped wrapper plate 34 in compression when the bolts 38 are subjected to torque. The resulting compression of the sides of U-shaped wrapper plate 34 causes axle 12 to be squeezed or ripped by the wrapper plate 34. The axle 12 is thereby strengthened by the resulting compressive load subjected to it at the point of clamping by the wrapper plate 34.

Axle support assembly 30 also includes a reinforcing plate 36 secured as by welding to side plate 32 and wrapper plate 34 for supporting and reinforcing wrapper plate 34. A shock absorber bracket 37 is provided at the inner side plate 32 for securing a lower portion of a shock absorber (not shown) to dampen oscillations of the axle.

In operation, axle 12 is secured within wrapper plate 34. Wrapper plate 34 is placed in compression by tightening bolts 38 so that the sides of wrapper plate 34 grip and compress axle 12. One or two plug welds 42 are then applied between the wrapper plate 34 and the axle 12. Plug weld 42 also acts to secure axle 12 within wrapper plate 34. As previously described, the size, shape and location of plug weld 42 are all selected so as to minimize stress risers and weaknesses typically associated with weldments on vehicle axles. In addition, the compression of the sides of wrapper plate 34 by bolts 38, as previously described, acts to strengthen axle 12 and prevent buckling and other failures.

Figure 5:
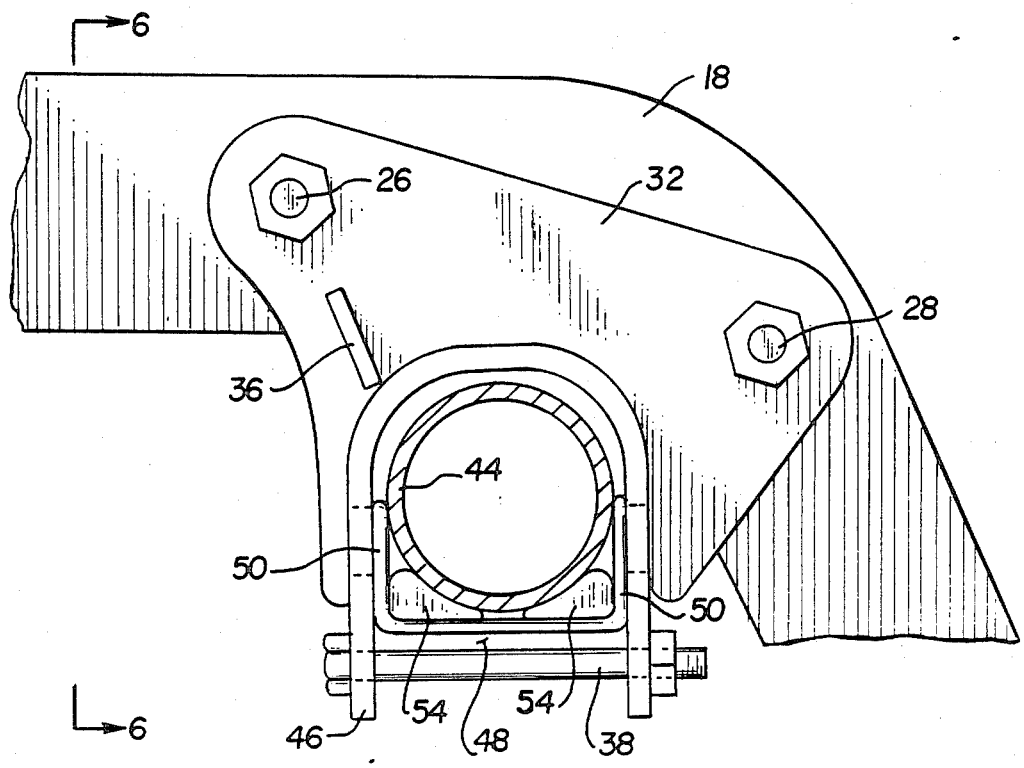
FIG. 5 is an enlarged, fragmentary side sectional view of a second embodiment of the invention.
Figure 6:
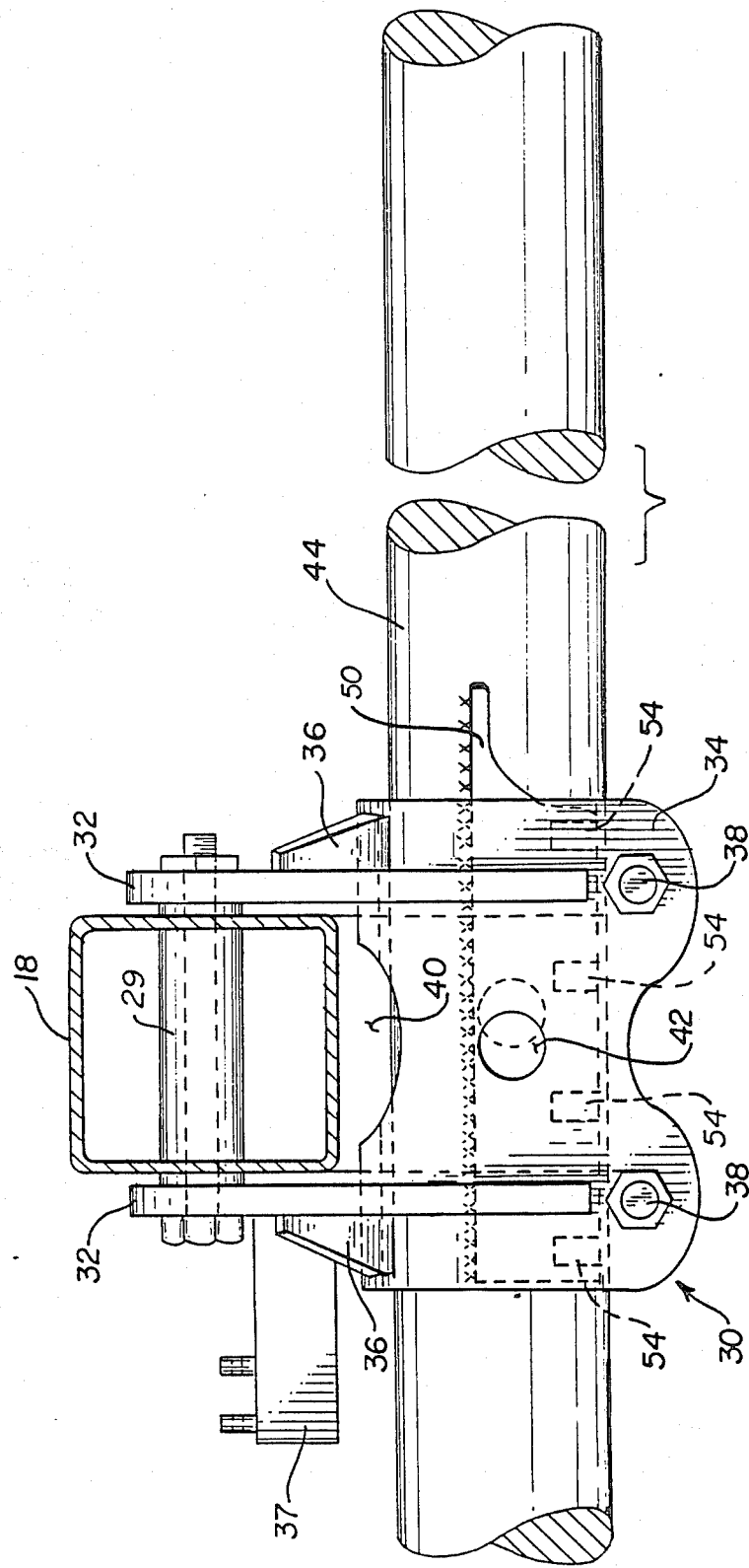
FIG. 6 is a sectional view taken along line 6—6 of FIG. 5.

The invention is also applicable for use with a round axle 44. As seen in FIG. 5, the invention may be adapted for use with a round axle 44 by use of a U-shaped wrapper plate 46 having an arcuate bight portion and by the use of a U-shaped adaptor 48 having upwardly extending sides 50. The upper ends of the sides 50 extend to a line at or near the vertical midpoint of the axle 44. Adaptor 48 is adapted to fit within wrapper plate 46 so that round axle 44 is partially encircled by the wrapper plate 46. As may be seen in FIG. 6, adaptor 48 extends beyond wrapper plate 46 on either side and is welded to axle 44 to form a smooth, minimum stress transition from axle to wrapper plate. The weld extends along a line at or near the vertical midpoint of the axle 44. Ends 52 of adaptor 48 are tapered so as to prevent stress risers. Supports 54 are spaced along the length of adaptor 48 and are shaped so as to accommodate the curvature of axle 44. Tightening of the bolts 38 diametrically compresses the axle 44 at or near the vertical midpoint thereof where the weld is formed.

An axle of D-shaped cross-section (not shown) can be utilized in place of round axle 44. The arcuate portion of the D-shaped axle corresponds to the bight portion of wrapper plate 46 so that an adaptor is unnecessary.

While particular embodiments of the invention have been shown, it will be understood that the invention is not limited thereto and reasonable modifications and variations are possible without departing from the spirit of the invention.

The embodiments of the invention in which an exclusive property or privilege is claimed are defined as follows:

1. A vehicle suspension system for mounting ground-engaging wheels to a vehicle frame, the suspension system comprising at least two substantially rigid arms secured to opposite sides of the frame through substantially aligned pivot mounts; at least one wheel-carrying axle mounted to said arms; and an axle support means securing said at least one axle to each of said arms; the improvement in each of said axle support means comprising:

a wrapper plate having an elongated planar complementary surface wrapping at least 180° around said axle and depending opposite sides extending beyond said axle;

compressing means for diametrically compressing said axle by drawing said opposite sides of said wrapper plate toward each other;

whereby said wrapper plate supports and strengthens said wheel carrying axle at the point at which said axle is connected to said rigid arms.

2. A vehicle suspension system according to claim 1 wherein said wrapper plate comprises a saddle-shaped plate and has an aperture extending through the bight portion thereof to reduce the weight of said wrapper plate.

3. A vehicle suspension system according to claim 2 wherein said compressing means comprises a bolt extending through said opposite sides of said wrapper plate and being adapted to compress said complementary surface against said axle when tightened.

4. A vehicle suspension system according to claim 3 and further comprising a small, non-linear weldment securing said axle to said wrapper plate.

5. A vehicle suspension system according to claim 4 wherein said opposite sides of said wrapper plate have a small, circular aperture extending therethrough adjacent the vertical midpoint of said axle; and said non-linear weldment is located within said aperture in said downwardly extending sides.

6. A vehicle suspension system according to claim 5 and further comprising a pair of side plates secured to each of said rigid arm each of said side plates having an opening of complementary shape to said wrapper plate, means securing said wrapper plate to said side plates and a reinforcing means between said side plates and said wrapper plate for supporting and reinforcing said wrapper plate.

7. A vehicle suspension system according to claim 6 wherein said reinforcing means comprises a gusset plate secured to at least one of said side plates and said wrapper plate.

8. A vehicle suspension system according to claim 3 and further comprising a pair of side plates secured to each of said rigid arms, each of said side plates having an opening of complementary shape to said wrapper plate, means securing said wrapper plate to said side plate and a reinforcing means between said side plates and said wrapper plate for supporting and reinforcing said wrapper plate.

9. A vehicle suspension system according to claim 8 wherein said reinforcing means comprises a plate secured to at least one of said side plates and said wrapper plate.

10. A vehicle suspension system according to claim 8 wherein said wrapper plate is U-shaped and said axle is square in cross-section.

11. A vehicle suspension system according to claim 1 and further comprising a small, non-linear weldment securing said axle to said wrapper plate.

12. A vehicle suspension system according to claim 11 wherein said small non-linear weldment is located adjacent the vertical midpoint of said axle.

13. A vehicle suspension system according to claim 12 and further comprising a pair of side plates secured to each of said rigid arms, each of said side plates having an opening of complementary shape to said wrapper plate, means securing said wrapper plate to said side plates and a reinforcing means between said side plates and said wrapper plate for supporting and reinforcing said wrapper plate.

14. A vehicle suspension system according to claim 13 wherein said reinforcing means comprises a plate secured to at least one of said side plates and said wrapper plate.

15. A vehicle suspension system according to claim 1 wherein said wrapper plate has an arcuate bight portion adapted to receive said axle and said axle has a circular cross-section of complementary size to said arcuate bight portion; and said compressing means comprises a bolt extending through said opposite sides and being adapted to compress said wrapper plate against said axle when tightened; and an adaptor means having an arcuate top surface of complementary shape to said axle and positioned beneath said axle to position said axle within said wrapper plate, and said wrapper plate depending sides extend beyond said adaptor means.

16. A vehicle suspension system according to claim 15 wherein said adaptor means has a tapered end which extends laterally along said axle at or near a vertical midpoint thereof and beyond said wrapper plate, and further comprising a weld extending between said tapered end and said axle at or near the vertical midpoint thereof.

17. A vehicle suspension system according to claim 16 wherein said wrapper plate is adapted to compress said axle along the vertical midpoint thereof.

18. A vehicle suspension system according to claim 1 wherein said wrapper plate is adapted to compress said axle at or near a vertical midpoint thereof.

* * * * *